H. M. HENRY.
VEHICLE TIRE.
APPLICATION FILED OCT. 1, 1920.
1,370,442.
Patented Mar. 1, 1921.
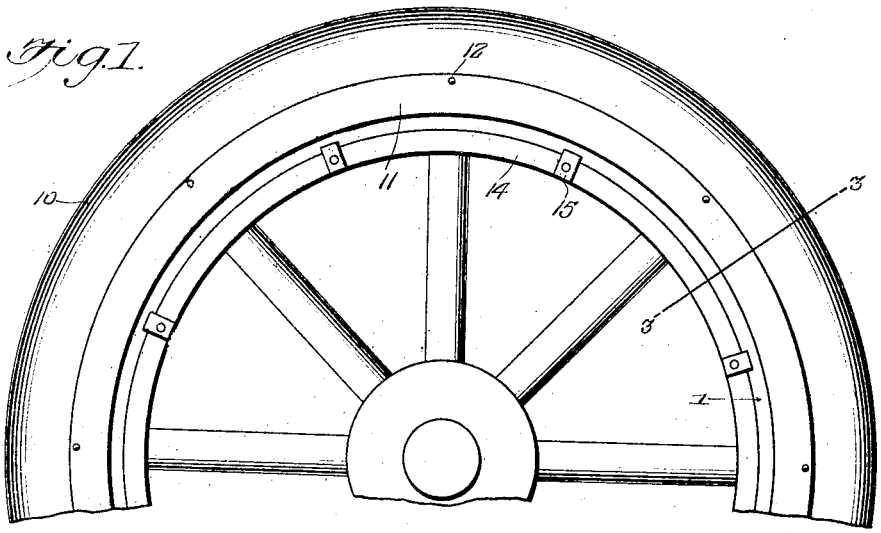
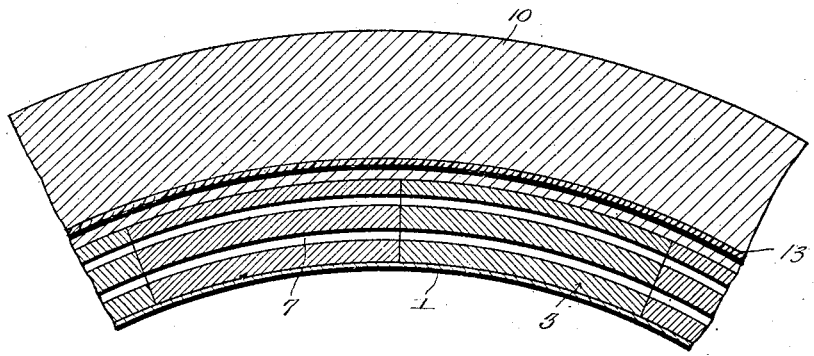
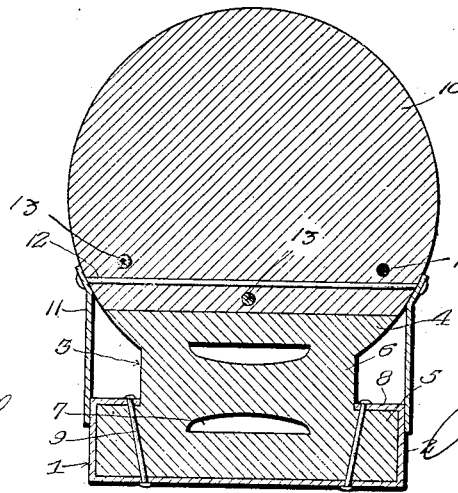
Witnesses
J. H. Crawford
Inventor
H. M. Henry,
Attorney

UNITED STATES PATENT OFFICE.

HAROLD M. HENRY, OF POTTSTOWN, PENNSYLVANIA.

VEHICLE-TIRE.

1,370,442.   Specification of Letters Patent.   Patented Mar. 1, 1921.

Application filed October 1, 1920. Serial No. 413,974.

*To all whom it may concern:*

Be it known that I, HAROLD M. HENRY, a citizen of the United States, residing at Pottstown, in the county of Montgomery and State of Pennsylvania, have invented certain new and useful Improvements in Vehicle-Tires; and I do hereby declare the following to be a full, clear, and exact description of the invention, such as will enable others skilled in the art to which it appertains to make and use the same.

This invention relates to new and useful improvements in vehicle tires and has for its primary object the provision of a device of the above stated character which will provide the desired resiliency without the employment of pneumatic cushioning means, thereby obviating the annoyance of punctures and blow-outs.

Another object of this invention is the provision of a solid tread member supported on a rim by cushion blocks, which are adapted to absorb shocks and jars and thereby render the necessary resiliency to the solid tread member.

A further object of this invention is the provision of means for securing the blocks to the rim which will permit said blocks to freely expand and contract when subjected to shocks and jars caused by the tread member passing over uneven ground.

A still further object of this invention is the provision of a vehicle tire of the above stated character, which will be simple, durable and efficient, and which may be manufactured and sold at a comparatively low cost.

With these and other objects in view as will became more apparent as the description proceeds, the invention consists in certain novel features of construction, combination, and arrangement of parts as will be hereinafter more fully described and claimed.

For a complete understanding of my invention, reference is to be had to the following description and accompanying drawings, in which:—

Figure 1 is a fragmentary side elevation illustrating a vehicle tire constructed in accordance with my invention, Fig. 2 is a fragmentary longitudinal sectional view illustrating the same, Fig. 3 is a transverse sectional view taken on the line 3—3 of Fig. 1.

Referring in detail to the drawings, the numeral 1 indicates a tire rim having side flanges 2 adapted to limit the lateral movement of a series of cushioning blocks 3 mounted on the rim 1. Each cushioning block consists of a tread engaging or supporting portion 4 connected to a base 5 by a reduced web 6. The block is preferably constructed from comparatively soft rubber and other well known ingredients so as to render the block extremely pliable. The base 5 and the tread engaging or supporting portion 4 are provided with circumferentially extending openings 7 adapted to add resiliency to said block. The blocks are arranged endwise to each other on the rim 1 and are held on said rim by retaining flanges formed on the side flanges 2 and overlying the base 5. Bolts 9 extend diagonally through the retaining flanges 8, base 5 and rim 1, thereby firmly securing the blocks to the rim. The tread engaging or supporting portions 4 of the blocks are of a width greater than the web portions and have straight outer faces adapted to support a tread member 10 constructed from a composition of rubber capable of withstanding considerable wear and is of substantially circular shape in cross section so as to render steering of a vehicle comparatively easy when equipped with my improved tires. Dust shields or plates 11 are secured to the sides of the tread member 10 adjacent its point of contact with the blocks by rods 12 that extend through said plates and tread member. The inner edges of the plates or dust shields frictionally contact with the sides 2 of the rim 1 to exclude dust, dirt and other foreign matter from the blocks and the junction of the blocks with the tread member and also aid in retaining the tread member on the rim and the blocks. The tread member is provided with circumferential reinforcing cables 13 at its base portion and upon opposite sides of the rods 12 to provide the necessary strength to the tread member.

The rim 1 is mounted and secured to the felly 14 of a wheel in the ordinary manner or by cleats 15; thus it will be seen that a solid tire is provided which may be readily and quickly applied to the rim or felly of a wheel and which will have the resilient qualities afforded by pneumatic tires without the annoyance of punctures and blow-outs frequent with pneumatic tires.

While I have shown and described the preferred embodiment of my invention, it will be understood that minor changes in construction, combination, and arrangement of parts may be made without departing from the spirit and scope of the invention as claimed.

Having thus described my invention what I claim is:—

A vehicle tire including a rim, cushioning blocks mounted on said rim, diagonally extending bolts extending through the rim and cushioning blocks, a solid tread member mounted on said blocks and of substantially circular shape in cross section, and plates secured to the sides of the tread member and frictionally engaging the rim to exclude dust from the cushioning blocks and permit the rim and blocks to move inwardly and outwardly when subjected to shocks and jars.

In testimony whereof I affix my signature in presence of two witnesses.

HAROLD M. HENRY.

Witnesses:
 FRANK PYLE,
 CHRISTINE HENRY.